US009568780B2

(12) United States Patent
Lee et al.

(10) Patent No.: US 9,568,780 B2
(45) Date of Patent: Feb. 14, 2017

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Gak Seok Lee, Hwaseong-si (KR); Hyeon Gu Cho, Yongin-si (KR)

(73) Assignee: SAMSUNG DISPLAY CO., LTD., Gyeonggi-do (KR)

(*) Notice: Subject to any disclaimer, the term of this patent is extended or adjusted under 35 U.S.C. 154(b) by 117 days.

(21) Appl. No.: 14/551,371

(22) Filed: Nov. 24, 2014

(65) Prior Publication Data

US 2015/0301421 A1    Oct. 22, 2015

(30) Foreign Application Priority Data

Apr. 22, 2014  (KR) .................. 10-2014-0048286

(51) Int. Cl.
*G02F 1/1343* (2006.01)
*G02F 1/1362* (2006.01)
*G02F 1/139* (2006.01)

(52) U.S. Cl.
CPC ....... *G02F 1/134309* (2013.01); *G02F 1/1393* (2013.01); *G02F 2001/134345* (2013.01); *G02F 2001/134381* (2013.01); *G02F 2001/136218* (2013.01)

(58) Field of Classification Search
CPC ........ G02F 2001/134345; G02F 2001/134381; G02F 1/13624; G02F 2001/136218
See application file for complete search history.

(56) References Cited

U.S. PATENT DOCUMENTS

| 7,450,207 | B2 | 11/2008 | Shimoshikiryo |
| 8,279,376 | B2 | 10/2012 | Chan et al. |
| 8,405,802 | B2 | 3/2013 | Hanaoka et al. |
| 2001/0019392 | A1* | 9/2001 | Sakamoto ............. G02F 1/1393 349/139 |
| 2009/0180069 | A1 | 7/2009 | Nishimura |
| 2012/0120334 | A1* | 5/2012 | Lee ................... G02F 1/133707 349/33 |

(Continued)

FOREIGN PATENT DOCUMENTS

| KR | 100877218 B1 | 12/2008 |
| KR | 1020120050645 A | 5/2012 |
| KR | 1020120100565 A | 9/2012 |

*Primary Examiner* — Paul Lee
*Assistant Examiner* — Jia Pan
(74) *Attorney, Agent, or Firm* — Cantor Colburn LLP

(57) ABSTRACT

A liquid crystal display includes: first and second display panels facing each other; and a liquid crystal layer between the first display panel and the second display panel and including an alignment assisting agent. The first display panel includes: a first substrate; a first gate line and a second gate line on the first substrate and spaced apart from each other; a data line crossing the first gate line and the second gate line; a shielding electrode on the data line and insulated from the data line; a first electrode electrically connected with the first gate line and the data line; a passivation layer on the first electrode; and a second electrode on the passivation layer and electrically connected with the second gate line and the shielding electrode. The second display panel includes a third electrode on a second substrate. The second electrode includes a branch portion.

20 Claims, 7 Drawing Sheets

(56) References Cited

U.S. PATENT DOCUMENTS

2012/0224128 A1* 9/2012 Jung .............. G02F 1/134309
                                                                349/129
2013/0057813 A1* 3/2013 Jeong ............. G02F 1/134309
                                                                349/110

\* cited by examiner

LIQUID CRYSTAL DISPLAY AND METHOD OF MANUFACTURING THE SAME

This application claims priority to Korean Patent Application No. 10-2014-0048286 filed on Apr. 22, 2014, and all the benefits accruing therefrom under 35 U.S.C. §119, the entire contents of which are incorporated herein by reference.

BACKGROUND (a) Field

The invention relates to a liquid crystal display and a method of manufacturing the same.

(b) Description of the Related Art

A liquid crystal display, which is one of the more common types of flat panel displays in use, typically includes two sheets of display panels with field generating electrodes such as a pixel electrode and a common electrode disposed thereon, and a liquid crystal layer interposed therebetween.

The liquid crystal display generates an electric field in a liquid crystal layer by applying voltage to the field generating electrodes, and determines the direction of liquid crystal molecules of the liquid crystal layer by the generated electric field, thus controlling polarization of incident light so as to display images.

The liquid crystal display includes a switching element that is connected to each pixel electrode, and a plurality of signal lines such as a gate line and a data line for applying voltage to a pixel electrode by controlling the switching element.

Among the liquid crystal displays, a vertically aligned ("VA") mode liquid crystal display in which long axes of liquid crystal molecules are aligned to be vertical to display panels while an electric field is not applied thereto has been spotlighted because a contrast ratio is relatively large and a standard viewing angle is relatively wide.

SUMMARY

Among the vertically aligned ("VA") mode liquid crystal displays, a super vertically aligned ("SVA") mode liquid crystal display, which has a fine slit pattern defined in a field generating electrode to form branch portions thereof and forms a pretilt by using an alignment supplement agent, such as mesogen, has been researched. In order to improve an optical property of the SVA mode liquid crystal display, such as transmittance and a response speed, a pitch of the fine slit pattern of the SVA mode liquid crystal display should be relatively small. When the pitch of the fine slit pattern is small, influence of a vertical electric field applied to the liquid crystal layer is increased, thereby degrading side view visibility.

One or more exemplary embodiment of the invention provides a liquid crystal display which has a high transmission property and a high speed response property, and reduces or effectively prevents a texture defect.

An exemplary embodiment of a liquid crystal display, includes: a first display panel and a second display panel facing each other; and a liquid crystal layer between the first display panel and the second display panel and including an alignment assisting agent. The first display panel includes: a first substrate; a first gate line and a second gate line on the first substrate and spaced apart from each other; a data line crossing the first gate line and the second gate line; a shielding electrode on the data line and insulated from the data line; a first electrode electrically connected with the first gate line and the data line; a passivation layer on the first electrode; and a second electrode on the passivation layer and electrically connected with the second gate line and the shielding electrode. The second display panel includes: a third electrode on a second substrate. The second electrode includes a branch portion.

The liquid crystal layer may be a light irradiated-voltage applied liquid crystal layer for which light is irradiated thereto in a state where a voltage is applied to each of the first electrode, the second electrode and the third electrode.

The second electrode may be floated in a driving state of the liquid crystal display by applying a gate-off voltage to the second gate line.

The first electrode may include a first sub electrode and a second sub electrode which are separated from each other.

The third electrode, the first sub electrode and the second sub electrode may have a plate shape.

The liquid crystal display may further include: a first thin film transistor connected to the first gate line, the data line and the first sub electrode; and a second thin film transistor connected to the first gate line, the data line and the second sub electrode.

The first display panel may further include a storage electrode line on the first substrate, and spaced apart from the first gate line and the second gate line.

The liquid crystal display may further include a third thin film transistor connected to the first gate line, the second thin film transistor and the storage electrode line.

The liquid crystal display may further include a fourth thin film transistor connected to the second gate line, the shielding electrode and the second electrode.

The second electrode may include a third sub electrode overlapping the first sub electrode, and a fourth sub electrode overlapping the second sub electrode, and each of the third sub electrode and the fourth sub electrode may include the branch portion.

The second electrode may further include a second electrode connection portion connected to the third sub electrode and the fourth sub electrode, and the second electrode connection portion may be connected to a terminal of the fourth thin film transistor.

The first electrode and the shielding electrode may be in a same layer.

A protruded portion of the shielding electrode may be connected to another terminal of the fourth thin film transistor.

The liquid crystal display may further include a first connection electrode, a second connection electrode and a third connection electrode, in a same layer as that of the second electrode, and spaced apart from each other.

The first connection electrode may electrically connect a terminal of the first thin film transistor with the first sub electrode, the second connection electrode may electrically connect a terminal of the second thin film transistor with the second sub electrode, and the third connection electrode may electrically connect a terminal of the third thin film transistor with the storage electrode line.

The liquid crystal display may further include a color filter between the data line and the first electrode.

One or more exemplary embodiment provides a method of manufacturing a liquid crystal display, including: providing a first display panel, including: forming a first gate line and a second gate line which are spaced apart from each other on a first substrate; forming a data line crossing the first gate line and the second gate line; forming a first passivation layer on the data line; forming on the first passivation layer, a first electrode electrically connected to the first gate line and the data line, and a shielding electrode overlapping the data line; forming a second passivation layer on the first electrode and the shielding electrode; and forming a second electrode, which is electrically connected to the second gate line and the shielding electrode, on the second passivation layer; providing a second display panel, including: forming a third electrode on a second substrate; assembling the first display panel and the second display panel to face each other; forming a liquid crystal layer including an alignment assisting agent between the first display panel and the second display panel; applying a voltage to the first electrode, the second electrode and the third electrode of the assembled first and second display panels, and irradiating light to the liquid crystal layer in a state where a voltage is applied to each of the first electrode, the second electrode and the third electrode. The second electrode includes a branch portion, and when the voltage is applied to the first electrode, the second electrode and the third electrode, the same voltage is applied to the second electrode and the third electrode.

As described above, according to one or more exemplary embodiment of the invention, control force of the liquid crystal molecules is improved by irradiating light to the liquid crystal layer in the state where the voltage is applied to the plate-shaped first electrode, the second electrode including the branch portion, and the plate-shaped third electrode, thereby reducing or effectively preventing a texture defect.

Further, since the liquid crystal molecules are mostly influenced by a vertical electric field according to the floating of the slitted/branch portion second electrode during the driving of the liquid crystal display, a decrease in transmittance by a horizontal electric field is reduced or effectively prevented and a high speed response is implemented.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
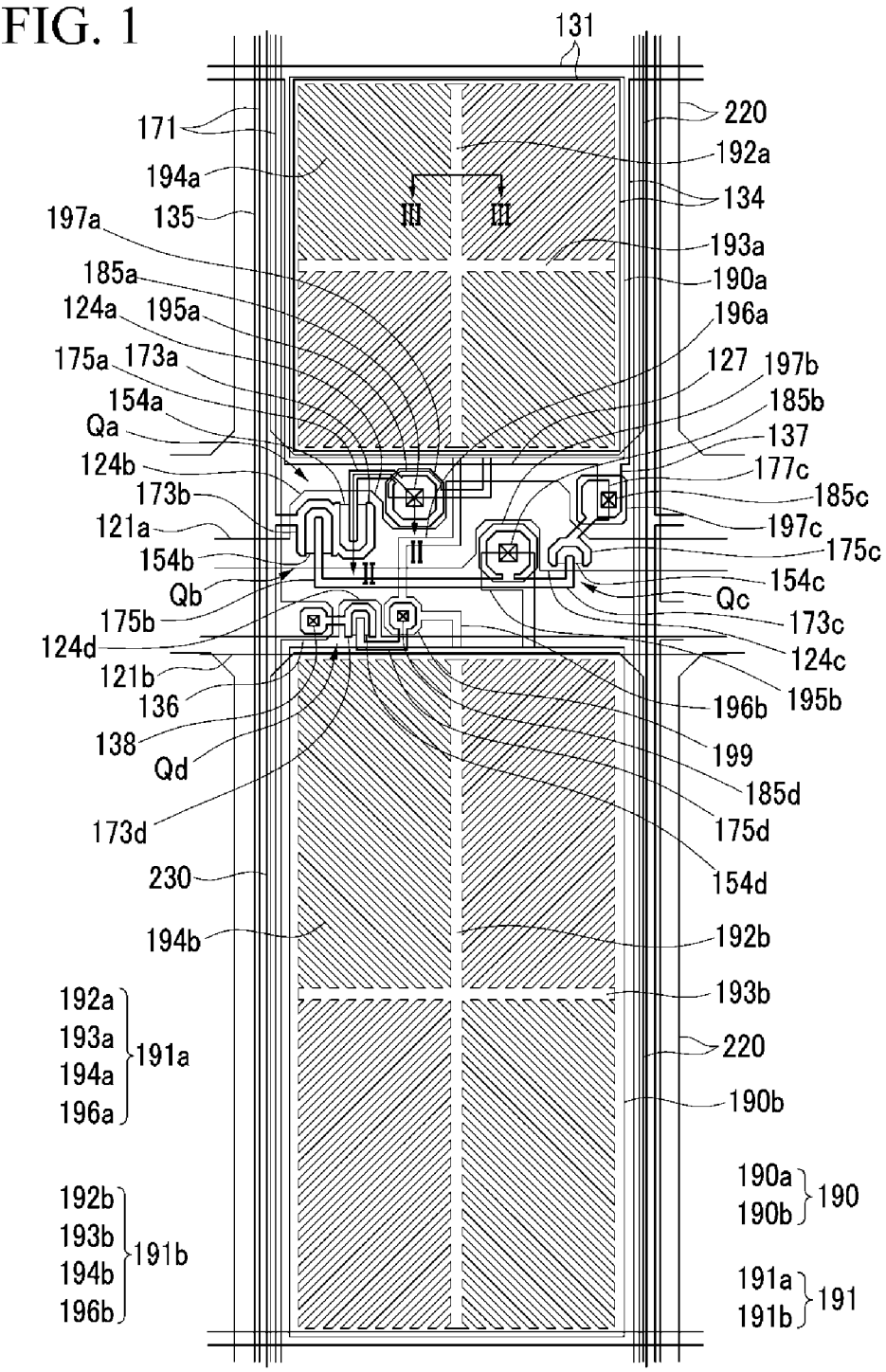
FIG. 1 is a top plan view illustrating an exemplary embodiment of a liquid crystal display according to the invention.

Exemplary embodiments of the invention will be described in detail with reference to the accompanying drawings. As those skilled in the art would realize, the described exemplary embodiments may be modified in various different ways, all without departing from the spirit or scope of the invention. On the contrary, exemplary embodiments introduced herein are provided to make disclosed contents thorough and complete and sufficiently transfer the spirit of the invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "under," "above," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
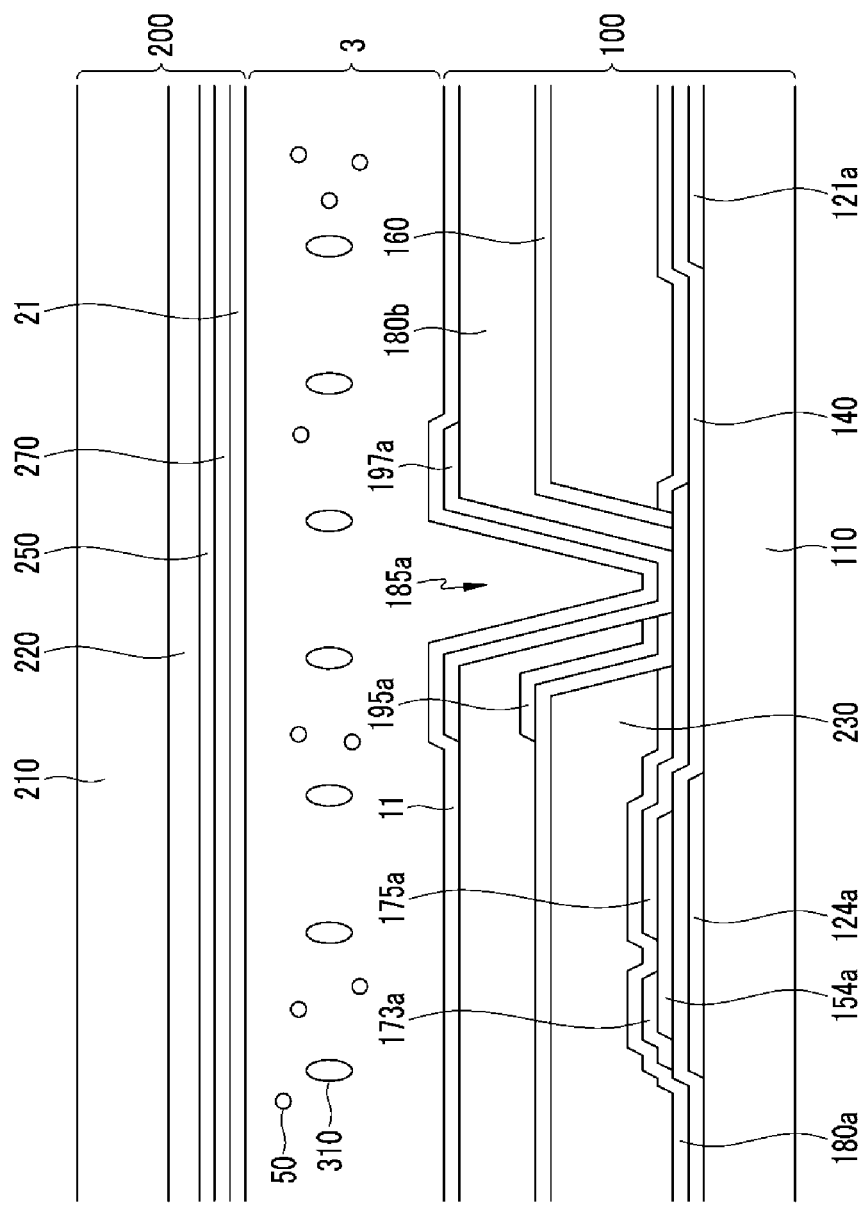
FIG. 2 is a cross-sectional view taken along line II-II of FIG. 1.
Figure 3:
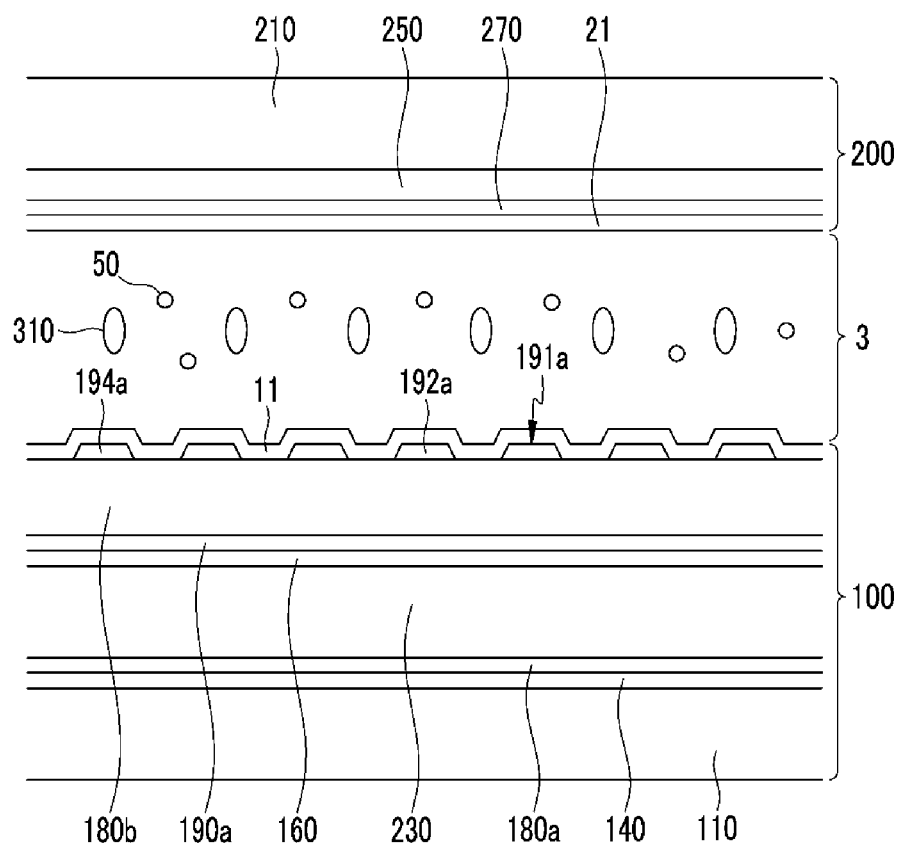
FIG. 3 is a cross-sectional view taken along line III-III of FIG. 1.

FIG. 1 is a top plan view illustrating an exemplary embodiment of a liquid crystal display according to the invention. FIG. 2 is a cross-sectional view taken along line II-II of FIG. 1. FIG. 3 is a cross-sectional view taken along line III-III of FIG. 1.

Referring to FIGS. 1 to 3, a liquid crystal display includes a first display panel 100 and a second display panel 200 which face each other, and a liquid crystal layer 3 interposed therebetween.

First, the first display panel 100 will be described.

A first gate line 121a, a second gate line 121b and a storage electrode line 131 are disposed on a first substrate 110 including a pixel area defined thereon. The first gate line 121a, the second gate line 121b and the storage electrode line 131 are spaced apart from each other.

The gate lines 121a and 121b mainly extend in a horizontal direction of the top plan view, and transfer a gate signal. The first gate line 121a includes a first gate electrode 124a protruded from a main portion thereof, a second electrode 124b protruded from the main portion thereof and a third gate electrode 124c protruded from the main portion thereof. The second gate line 121b includes a fourth gate electrode 124d protruded from a main portion thereof. Herein, the first gate electrode 124a and the second gate electrode 124b are connected and continuous with each other, and the third gate electrode 124c is spaced apart from the second gate electrode 124b.

The storage electrode line 131 mainly extends in the horizontal direction of the top plan view and transfers a predetermined voltage such as a common voltage. Protruded from a main potion of the storage electrode line 131 are a pair of vertical portions 134 that substantially and vertically extend downward in the top plan view with respect to the first and second gate lines 121a and 121b, and a horizontal portion 127 connecting ends of the pair of vertical portions 134 to each other. The horizontal portion 127 includes a storage electrode protruding part 137 protruding from a main portion thereof.

A gate insulating layer 140 is disposed on the first gate line 121a, the second gate line 121b and the storage electrode line 131. The gate insulating layer 140 may include an inorganic insulating material, such as silicon nitride (SiNx) or silicon oxide (SiOx). Further, the gate insulating layer 140 may have a single layer structure or a multilayer structure.

A first semiconductor layer 154a, a second semiconductor layer 154b, a third semiconductor layer 154c and a fourth semiconductor layer 154d are disposed on the gate insulating layer 140. The first semiconductor layer 154a is disposed on the first gate electrode 124a, the second semiconductor layer 154b is disposed on the second gate electrode 124b, the third semiconductor layer 154c is disposed on the third gate electrode 124c, and the fourth semiconductor layer 154d is disposed on the fourth gate electrode 124d.

A data line 171, a first source electrode 173a, a first drain electrode 175a, a second source electrode 173b, a second drain electrode 175b, a third source electrode 173c, a third drain electrode 175c, a fourth source electrode 173d and a fourth drain electrode 175d are disposed on the first to fourth semiconductor layers 154a, 154b, 154c and 154d, and on the gate insulating layer 140.

The first to fourth semiconductor layers 154a, 154b, 154c and 154d may be disposed under the data line 171, as well as on (e.g., above) the first to fourth gate electrodes 124a, 124b, 124c and 124d, with respect to the cross-sectional view. Further, the second semiconductor layer 154b and the third semiconductor layer 154c may also be connected and continuous with each other. However, the invention is not limited thereto, and the first to fourth semiconductor layers 154a, 154b, 154c and 154d may be disposed only on the first to fourth gate electrodes 124a, 124b, 124c and 124d (e.g., not under the data line 171), and the second semiconductor layer 154b and the third semiconductor layer 154c may be separate from (e.g., not connected or continuous with) each other.

The data line 171 transfers a data signal and mainly extends in a vertical direction in the top plan view to cross the first and second gate lines 121a and 121b.

The first source electrode 173a is disposed to protrude from the data line 171 and overlap the first gate electrode 124a. In the top plan view, the first source electrode 173a may be bent in a shape of a letter "C" which overlaps the first gate electrode 124a.

The first drain electrode 175a is disposed to be spaced apart from the first source electrode 173a and overlap the first gate electrode 124a. A channel is formed in an exposed portion of the first semiconductor layer 154a between the first source electrode 173a and the first drain electrode 175a, which are disposed to be spaced apart from each other.

The second source electrode 173b is disposed to protrude from the data line 171 and overlap the second gate electrode 124b. The second source electrode 173b is connected and continuous with the first source electrode 173a. In the top plan view, the second source electrode 173b may be bent in a shape of a letter "C" and overlap the second gate electrode 124b.

The second drain electrode 175b is disposed to be spaced apart from the second source electrode 173b and overlap the second gate electrode 124b. A channel is formed in an exposed portion of the second semiconductor layer 154b between the second source electrode 173b and the second drain electrode 175b which are disposed to be spaced apart from each other.

The third source electrode 173c is connected and continuous with the second drain electrode 175b, and is disposed on the third gate electrode 124c.

The third drain electrode 175c is disposed to be spaced apart from the third source electrode 173c and overlap the third gate electrode 124c. The third drain electrode 175c includes an expanded portion 177c overlapping the storage electrode protruding portion 137. A channel is formed in an exposed portion of the third semiconductor layer 154c between the third source electrode 173c and the third drain electrode 175c which are disposed to be spaced apart from each other.

The fourth source electrode 173d is spaced apart from the data line 171, and is disposed on the fourth gate electrode 124d.

The fourth drain electrode 175d is disposed to be spaced apart from the fourth source electrode 173d and overlap the fourth gate electrode 124d. A channel is formed in an exposed portion of the fourth semiconductor layer 154d between the fourth source electrode 173d and the fourth drain electrode 175d which are disposed to be spaced apart from each other.

Here, the first gate electrode 124a, the first source electrode 173a and the first drain electrode 175a form a first thin film transistor Qa together with the first semiconductor layer 154a, and the second gate electrode 124b, the second source electrode 173b and the second drain electrode 175b form a second thin film transistor Qb together with the second semiconductor layer 154b. Further, the third gate electrode 124c, the third source electrode 173c and third drain electrode 175c form a third thin film transistor Qc together with the third semiconductor layer 154c, and the fourth gate electrode 124d, the fourth source electrode 173d and the fourth drain electrode 175d form a fourth thin film transistor Qd together with the fourth semiconductor layer 154d.

Ohmic contacts (not shown) may also be disposed between the first to fourth semiconductor layers 154a, 154b, 154c and 154d, and the first to fourth source electrodes 173a, 173b, 173c and 173d and the first to fourth drain electrodes 175a, 175b, 175c and 175d, respectively, to improve a contact resistant property thereof. The ohmic contacts may include a material such as n+ hydrogenated amorphous silicon to which silicide or an n-type impurity is doped at a relatively high concentration.

A first passivation layer 180a is disposed on the data line 171, the first to fourth source electrodes 173a, 173b, 173c and 173d, the first to fourth drain electrodes 175a, 175b, 175c and 175d, and the gate insulating layer 140.

The first passivation layer 180a may include an inorganic insulating material, such as a silicon nitride or a silicon oxide.

A color filter 230 is disposed on the first passivation layer 180a. The color filter 230 is disposed to be elongated in the vertical direction at a space between adjacent data lines 171. In the illustrated exemplary embodiment, the color filter 230 is disposed in the first display panel 100, but the invention is not limited thereto. In an exemplary embodiment, the color filter 230 may be disposed in the second display panel 200.

A capping layer 160 is disposed on the color filter 230. The capping layer 160 is configured to reduce or effectively prevent contamination of an upper layer portion of the color filter 230 due to gas generated from the color filter 230. The capping layer 160 may include an inorganic insulating material, such as a silicon nitride or a silicon oxide.

A first electrode 190 having a plate shape is disposed on the capping layer 160. As a plate shape, the first electrode 190 may be a single, continuous member in which openings such as slits are not defined. Further, a shielding electrode 135 is disposed on the capping layer 160 at a portion corresponding to the data line 171. The first electrode 190 and the shielding electrode 135 may include the same material and/or be in a same layer. The shielding electrode 135 and the data line 171 overlap and are insulated from each other.

The first electrode 190 includes a first sub electrode 190a disposed above the first gate line 121a, and a second sub electrode 190b disposed under the first gate line 121a, in the top plan view. The first sub electrode 190a includes a first distal end 195a extending from a main portion thereof to overlap an end of the first drain electrode 175a. The second sub electrode 190b includes a second distal end 195b extending from a main portion thereof to overlap an end of the second drain electrode 175b. Herein, an area taken in the top plan view of the second sub electrode 190b, may be one to two times that of the first sub electrode 190a.

A predetermined voltage, such as the common voltage and the like, is applied to the shielding electrode 135, thereby reducing or effectively preventing the data line 171 from influencing liquid crystal molecules of the liquid crystal layer 3. The shielding electrode 135 includes a shielding electrode protruding portion 136 protruding from a main portion thereof to be connected to the fourth source electrode 173d. The shielding electrode protruding portion 136 and the fourth source electrode 173d are electrically connected through a shielding electrode contact hole 138. The shielding electrode contact hole 138 may be formed defined in the first passivation layer 180a, the color filter 230 and the capping layer 160.

A second passivation layer 180b including an inorganic insulating material or an organic insulating material is disposed on the first electrode 190 and the shielding electrode 135. A first contact hole 185a, a second contact hole 185b, a third contact hole 185c and a fourth contact hole 185d are formed defined in the second passivation layer 180b. A part of the first drain electrode 175a is exposed through the first contact hole 185a, and a part of the second drain electrode 175b is exposed through the second contact hole 185b. A part of the third drain electrode 175c is exposed through the third contact hole 185c, and a part of the fourth drain electrode 175d is exposed through the fourth contact hole 185d. The first to fourth contact holes 185a, 185b, 185c and 185d extend to the capping layer 160 and the first passivation layer 180a.

A second electrode 191, a first connection electrode 197a, a second connection electrode 197b and a third connection electrode 197c are disposed on the second passivation layer 180b. The second electrode 191, the first connection electrode 197a, the second connection electrode 197b and the third connection electrode 197c are spaced apart from each other. The second electrode 191, the first connection electrode 197a, the second connection electrode 197b and the third connection electrode 197c include the same material and are in a same layer as each other.

The first connection electrode 197a electrically connects the first distal end 195a of the first sub electrode 190a with the first drain electrode 175a via the first contact hole 185a. That is, the first drain electrode 175a is connected to the first sub electrode 190a.

The second connection electrode 197b electrically connects the second distal end 195b of the second sub electrode 190b with the second drain electrode 175b via the second contact hole 185b. That is, the second drain electrode 175a is connected to the second sub electrode 190b.

The third connection electrode 197c electrically connects the storage electrode protrusion portion 137 with the expanded portion 177c of the third drain electrode 175c via the third contact hole 185c. That is, the third drain electrode 175c is connected to the storage electrode line 131.

The second electrode 191 includes a third sub electrode 191a disposed above the first gate line 121a, and a fourth sub electrode 191b disposed under the first gate line 121a, in the top plan view. That is, the third sub electrode 191a overlaps the first sub electrode 190a, and the fourth sub electrode 191b overlaps the second sub electrode 190b.

Each of the third sub electrode 191a and the fourth sub electrode 191b includes a cross-shaped stem portion including vertical stem portions 192a and 192b, and horizontal stem portions 193a and 193b crossing the vertical stem portions 192a and 192b. Further, each of the third sub electrode 191a and the fourth electrode 191b includes a plurality of fine branch portions 194a and 194b. The fine branch portions 194a and 194b are defined by slits defined in the third sub electrode 191a and the fourth electrode 191b. A planar area of the fourth sub electrode 191b may be one to two times that of the third sub electrode 191a.

Each of the third sub electrode 191a and the fourth sub electrode 191b is divided into four sub regions by the horizontal stem portions 193a and 193b and the vertical stem portions 192a and 192b. The fine branch portions 194a and 194b extend at an incline from the horizontal stem portions 193a and 193b and the vertical stem portions 192a and 192b, and the extension direction may form an angle of approximately 45 degrees (°) or 135° with the first and second gate lines 121a and 121b or the horizontal stem portions 193a and 193b. Further, the fine branch portions 194a and 194b of two adjacent sub regions may be orthogonal to each other.

Further, the third sub electrode 191a and the fourth sub electrode 191b include a first extended portion 196a and a second extended portion 196b extended from the vertical stem portions 192a and 192b, respectively. The first and second extended portions 196a and 196b are each connected to a second electrode connection portion 199, and the second electrode connection portion 199 is connected to the fourth drain electrode 175d via the fourth contact hole 185d.

A first alignment layer 11 is disposed on the second electrode 191, the first connection electrode 197a, the second connection electrode 197b and the third connection electrode 197c.

Next, the second display panel 200 will be described.

A light blocking member 220, an overcoat 250 and a third electrode 270 are disposed on a second substrate 210, and a second alignment layer 21 is disposed on the third electrode 270.

The light blocking member 220 extends along the first gate line 121a and the second gate line 121b to be vertically extended in the top plan view, The light blocking member 220 covers a region in which the first thin film transistor Qa, the second thin film transistor Qb, the third thin film transistor Qc, the fourth thin film transistor Qd and the like are positioned, and extends along the data line 171.

The third electrode 270 is disposed with a plate shape in the pixel area, and a predetermined voltage, such as the common voltage and the like, is applied to the third electrode 270. As a plate shape, the third electrode 270 may be a single, continuous member in which openings such as slits are not defined.

The liquid crystal layer 3 has negative dielectric anisotropy, and liquid crystal molecules 310 of the liquid crystal layer 3 are aligned so that long axes thereof are cross-sectionally vertical to the surfaces of the two display panels 100 and 200 in a state in which there is no electric field. The liquid crystal layer 3 may include an alignment assisting agent 50 including reactive mesogen, so that the liquid crystal molecules 310 may have a pretilt for which long axes thereof are approximately parallel to a longitudinal direction of the fine branch portions 194a and 194b of the second electrode 191. In an exemplary embodiment, the alignment assisting agent 50 may be included in the first and second alignment layers 11 and 21, and not in the liquid crystal layer 3.

A method of manufacturing the liquid crystal display according to the invention will be described with reference to FIGS. 1 to 3, 4 and 5.

Figure 4:
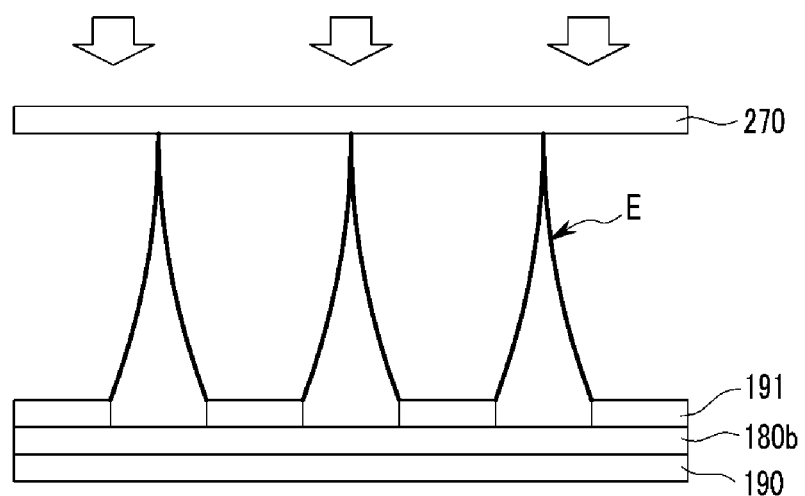
FIG. 4 is a cross-sectional view schematically illustrating an exemplary embodiment of a method of manufacturing a liquid crystal display according to the invention.
Figure 5:
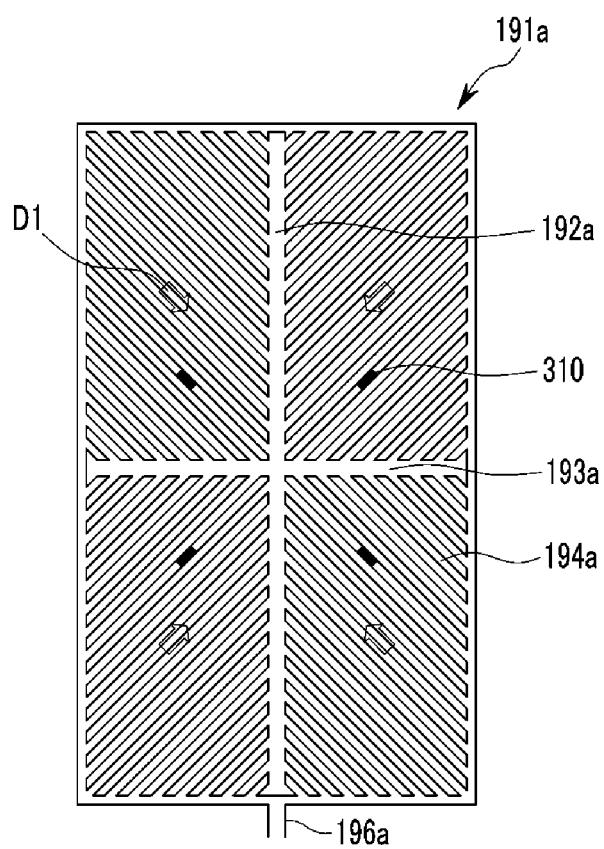
FIG. 5 is a top plan view illustrating an exemplary embodiment of a second electrode of a liquid crystal display according to the invention.

FIG. 4 is a cross-sectional view schematically illustrating an exemplary embodiment of a method of manufacturing a liquid crystal display according to the invention. FIG. 5 is a top plan view schematically illustrating an exemplary embodiment of a second electrode according to the invention.

Referring to FIGS. 1 to 3, first, each of a first display panel 100 and a second display panel 200 is manufactured.

The first display panel 100 is manufactured by the following method.

A first gate line 121a, a second gate line 121b a storage electrode line 131, a gate insulating layer 140, first to fourth semiconductor layers 154a, 154b, 154c and 154d, a data line 171, first to fourth source electrodes 173a, 173b, 173c and 173d, first to fourth drain electrodes 175a, 175b, 175c and 175d, a first passivation layer 180a, a color filter 230, and a capping layer 160 are sequentially formed on the first substrate 110, such as by stacking and patterning a plurality of thin films.

A first conductive layer, such as indium tin oxide ("ITO") and indium zinc oxide ("IZO"), is stacked on the capping layer 160, a shielding electrode 135 and a first electrode 190 are formed by patterning the first conductive layer, and then a second passivation layer 180b is formed on the first electrode 190 and the shielding electrode 135.

A second conductive layer, such as ITO and IZO, is stacked on the second passivation layer 180b, and a second electrode 191, a first connection electrode 197a, a second connection electrode 197b and a third connection electrode 197c are formed by patterning the second conductive layer. Next, a first alignment layer 11 is formed on the second electrode 191.

The second display panel 200 is manufactured by the following method.

A light blocking member 220, an overcoat 250 and a third electrode 270 are sequentially formed on a second substrate 210, and a second alignment layer 21 is formed on the third electrode 270.

Next, the first display panel 100 and the second display panel 200, which are manufactured by the aforementioned method, are assembled, and liquid crystal molecules 310 and an alignment assisting agent 50 are injected therebetween to form the liquid crystal layer 3. In another exemplary embodiment, the liquid crystal layer 3 may also be formed in a manner where the liquid crystal molecules 310 and the alignment assisting agent 50 are dripped on the first display panel 100 and/or the second display panel 200. In the illustrated exemplary embodiment, the alignment assisting agent 50 is included in the liquid crystal layer 3, but the invention is not limited thereto. In an exemplary embodiment, the alignment assisting agent 50 may be included in the first and/or second alignment layers 11 and 21.

Referring to FIG. 4, a voltage is applied to the first electrode 190, the second electrode 191 and the third electrode 270. A data voltage is applied to the first electrode 190 from the data line 171. A common voltage is applied to the second electrode 191 from the shielding electrode 135. The common voltage is applied to the third electrode 270. That is, the same voltage is applied to the second electrode 191 and the third electrode 270. A voltage applied to the first electrode 190 may be different from that applied to the second electrode 191 and the third electrode 270. For convenience of illustration, elements of the first display panel 100 and the second display panel 200 other than the first electrode 190, the second electrode 191 and the third electrode 270 are omitted in FIG. 4.

As described above, when the voltage is applied to the first electrode 190, the second electrode 191 and the third electrode 270, an electric field is generated between the first display panel 100 and the second display panel 200. The same voltage is applied to the second electrode 191 and the third electrode 270, so that an electric field is not generated between the second electrode 191 and the third electrode 270, and an electric field is generated between the first electrode 190 and the third electrode 270. However, the second electrode 191 influences the first electrode 190, so that a fringe field E is formed.

Then, in the state where the fringe field E illustrated in FIG. 4 is formed, light (indicated by the downward arrows) is irradiated to the liquid crystal display. Accordingly, the liquid crystal molecules 310 may have a pretilt. Herein, the light may be ultraviolet rays.

As described above, light is irradiated to the liquid crystal layer 3 in the state where the voltage is applied to the first electrode 190, the second electrode 191 and the third electrode 270, and thus control force of pretilting the liquid crystal molecules 310 is improved. Where the pretilting of the liquid crystal molecules 310 is improved, a texture defect may be reduce or effectively prevented.

Then, a domain direction exhibited when the voltage is applied to the first electrode 190, the second electrode 191 and the third electrode 270 will be described with reference to FIG. 5.

Referring to FIG. 5, only the third sub electrode 191a of the second electrode 191 is illustrated. When the voltage is applied to the first to third electrodes 190, 191 and 270, the fringe field E is generated, so that the liquid crystal molecules 310 lie toward an internal direction D1 of the pixel area. Particularly, only an intensive fringe field E is present in a non-electrode portion between the fine branch portions 194a of the third sub electrode 191a to align the liquid crystal molecules 310 in a predetermined direction. A final domain direction of the entire of the liquid crystal molecules is determined by elastic energy between the liquid crystal molecules 310 lying in the predetermined direction, in cooperation with a vertical electric field of the fine branch portion 194a.

In the illustrated exemplary embodiment, during the driving of the liquid crystal display, the second electrode 191 is electrically and physically floated, so that the second electrode 191 does not participate in the driving of the liquid crystal display.

A direction of an electric field generated during driving of the liquid crystal display according to the invention will be described with reference to FIG. 6.

Figure 6:
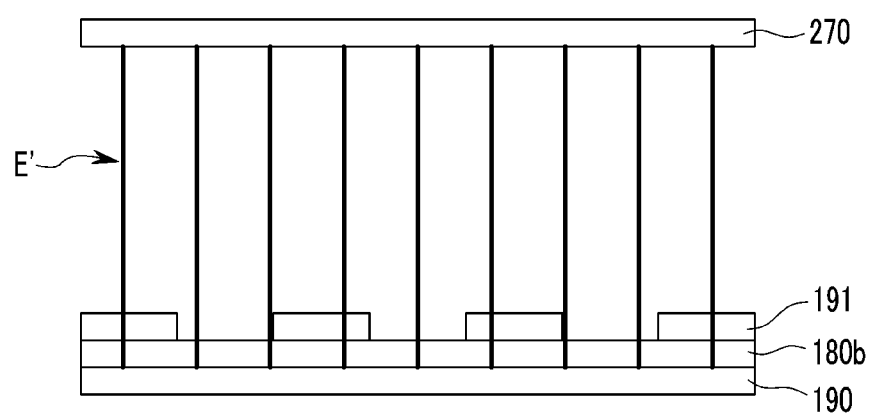
FIG. 6 is a cross-sectional view illustrating a direction of an exemplary embodiment of an electric field generated during driving of the liquid crystal display according to the invention.

FIG. 6 is a cross-sectional view illustrating a direction of an exemplary embodiment of an electric field generated during driving of a liquid crystal display according to the invention. For convenience of illustration, elements of the first display panel 100 and the second display panel 200 other than the first electrode 190, the second electrode 191 and the third electrode 270 are omitted in FIG. 6.

Referring to FIG. 6, a vertical electric field E' is generated between the first electrode 190 and the third electrode 270. In the illustrated exemplary embodiment, a gate-on voltage is applied to the first gate line 121a, and a gate-off voltage is applied to the second gate line 121b during the driving of the liquid crystal display. Accordingly, a data voltage is applied to the first electrode 190 connected to the first gate line 121a, and the second electrode 191 connected to the second gate line 121b is electrically floated. That is, the second electrode 191 does not participate in the driving of the liquid crystal display, so that the vertical electric field E' is generated between the first electrode 190 and the third electrode 270.

Accordingly, movement of the liquid crystal molecules during driving of the liquid crystal display is mostly influenced by the vertical electric field E', such that the liquid crystal molecules are effectively moved by only the vertical electric field E'. Since the liquid crystal molecules are effectively moved by only the vertical electric field E' during the driving of the liquid crystal display, a decrease in transmittance by a horizontal electric field is reduced or effectively prevented and a high speed response is implemented.

Then, an exemplary embodiment of an operation of the liquid crystal display according to the invention will be described with reference to FIG. 7.

Figure 7:
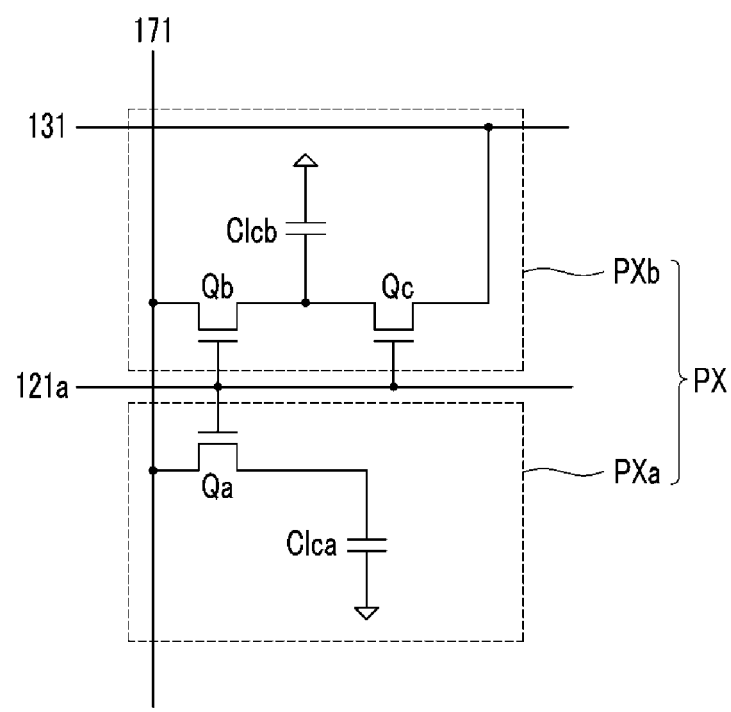
FIG. 7 is an equivalent circuit diagram illustrating an exemplary embodiment of one pixel of a liquid crystal display according to the invention.

FIG. 7 is an equivalent circuit diagram illustrating an exemplary embodiment of one pixel of a liquid crystal display according to the invention.

Referring to FIG. 7, the first and second thin film transistors Qa and Qb are each connected to the first gate line 121a and the data line 171. The third thin film transistor Qc is connected to the first gate line 121a and the storage electrode line 131. As described above, the second electrode 191 is electrically floated during the driving of the liquid crystal display, so that the fourth thin film transistor Qd, the second gate line 121b and the shielding electrode 135 connected to the second electrode 191 are not illustrated in the equivalent circuit diagram according to FIG. 7.

A pixel PX includes first and second sub pixels PXa and PXb. A first liquid crystal capacitor Clca connected to the first thin film transistor Qa is disposed in the first sub pixel PXa, and a second liquid crystal capacitor Clcb connected to the second thin film transistor Qb is disposed in the second sub pixel PXb. Herein, according to FIG. 1, the first sub pixel PXa includes the first sub electrode 190a, and the second sub pixel PXb includes the second sub electrode 190b.

A first terminal of the first thin film transistor Qa is connected to the first gate line 121a, a second terminal of the first thin film transistor Qa is connected to the data line 171 and a third terminal of the first thin film transistor Qa is connected to the first liquid crystal capacitor Clca. Here, the third terminal of the first thin film transistor Qa is connected to the first sub electrode 190a which forms a part of the first liquid crystal capacitor Clca.

A first terminal of the second thin film transistor Qb is connected to the first gate line 121a, a second terminal of the second thin film transistor Qb is connected to the data line 171 and a third terminal of the second thin film transistor Qb is connected to the second liquid crystal capacitor Clcb. Herein, the third terminal of the second thin film transistor Qb is connected to the second sub electrode 190b which forms a part of the second liquid crystal capacitor Clcb.

A first terminal of the third thin film transistor Qc is connected to the first gate line 121a, a second terminal of the third thin film transistor Qc is connected to the storage electrode line 131 and a third terminal of the third thin film transistor Qc is connected to the third terminal of the second thin film transistor Qb.

When the gate-on voltage is applied to the first gate line 121a, the first to third thin film transistors Qa, Qb and Qc connected to the first gate line 121a are turned on, and the first liquid crystal capacitor Clca and the second liquid crystal capacitor Clcb are charged by the data voltage transmitted through the data line 171.

Since the thin film transistor Qc is in a turn-on state, the data voltage transmitted to the second sub pixel PXb through the data line 171 is divided through the third thin film transistor Qc serially connected to the second thin film transistor Qb. Since the third thin film transistor Qc is turned on, the voltage applied to the second sub pixel PXb is divided according to a voltage difference between the voltage applied to the storage electrode line 131 and the data voltage, and a resistance value of the third thin film transistor Qc.

Accordingly, even though the data voltages transmitted to the first sub pixel PXa and the second sub pixel PXb through the data line 171 are equal to each other, the voltages charged in the first liquid crystal capacitor Clca and the second liquid crystal capacitor Clcb are different from each other. That is, the voltage charged in the second liquid crystal capacitor Clcb is lower than the voltage charged in the first liquid crystal capacitor Clca. Where the data voltages applied to the first sub pixel PXa and the second sub pixel PXb are positive the voltage charged in the second liquid crystal capacitor Clcb is lower than the voltage charged in the first liquid crystal capacitor Clca. Where the data voltages applied to the first sub pixel PXa and the second sub pixel PXb are negative, the voltage charged in the first liquid crystal capacitor Clca is lower than the voltage charged in the second liquid crystal capacitor Clcb.

Accordingly, it is possible to improve side view visibility by differentially changing the voltages charged in the first and second sub pixels PXa and PXb within the same pixel PX.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
 a first display panel comprising:
  a first gate line and a second gate line on a first substrate, and spaced apart from each other;
  a data line crossing the first gate line and the second gate line;
  a shielding electrode on the data line, and insulated from the data line;
  a first electrode electrically connected with the first gate line and the data line;
  a passivation layer on the first electrode; and
  a second electrode on the passivation layer, and electrically connected with the second gate line and the shielding electrode;
 a second display panel facing the first substrate and comprising:
  a third electrode on a second substrate; and
 a liquid crystal layer between the first display panel and the second display panel, and comprising an alignment assisting agent,
 wherein the second electrode comprises a branch portion.

2. The liquid crystal display of claim 1, wherein the liquid crystal layer is a light irradiated-voltage applied liquid crystal layer for which light is irradiated thereto in a state where a voltage is applied to each of the first electrode, the second electrode and the third electrode.

3. The liquid crystal display of claim 2, wherein the second electrode is floated in a driving state of the liquid crystal display, by applying a gate-off voltage to the second gate line.

4. The liquid crystal display of claim 1, wherein the first electrode comprises a first sub electrode and a second sub electrode which are separated from each other.

5. The liquid crystal display of claim 4, wherein the third electrode, the first sub electrode and the second sub electrode have a plate shape.

6. The liquid crystal display of claim 5, further comprising:
 a first thin film transistor connected to the first gate line, the data line and the first sub electrode; and
 a second thin film transistor connected to the first gate line, the data line and the second sub electrode.

7. The liquid crystal display of claim 6, wherein the first display panel further comprises a storage electrode line on the first substrate, and spaced apart from the first gate line and the second gate line.

8. The liquid crystal display of claim 7, further comprising a third thin film transistor connected to the first gate line, the second thin film transistor and the storage electrode line.

9. The liquid crystal display of claim 8, further comprising a fourth thin film transistor connected to the second gate line, the shielding electrode and the second electrode.

10. The liquid crystal display of claim 9, wherein
 the second electrode comprises a third sub electrode overlapping the first sub electrode, and a fourth sub electrode overlapping the second sub electrode, and
 each of the third sub electrode and the fourth sub electrode comprises the branch portion.

11. The liquid crystal display of claim 10, wherein the second electrode further comprises a second electrode connection portion connected to the third sub electrode and the fourth sub electrode, and
 the second electrode connection portion is connected to a terminal of the fourth thin film transistor.

12. The liquid crystal display of claim 11, wherein the first electrode and the shielding electrode are in a same layer.

13. The liquid crystal display of claim 12, wherein a protruded portion of the shielding electrode is connected to another terminal of the fourth thin film transistor.

14. The liquid crystal display of claim 13, further comprising a first connection electrode, a second connection electrode and a third connection electrode in a same layer as the second electrode, and are spaced apart from each other.

15. The liquid crystal display of claim 14, wherein
 the first connection electrode electrically connects a terminal of the first thin film transistor and the first sub electrode,
 the second connection electrode electrically connects a terminal of the second thin film transistor and the second sub electrode, and
 the third connection electrode electrically connects a terminal of the third thin film transistor and the storage electrode line.

16. The liquid crystal display of claim 1, further comprising a color filter between the data line and the first electrode.

17. A method of manufacturing a liquid crystal display, comprising:
provialing a first display panel, comprising:
forming a first gate line and a second gate line which are spaced apart from each other, on a first substrate;
forming a data line crossing the first gate line and the second gate line;
forming a first passivation layer on the data line;
forming on the first passivation layer, a first electrode electrically connected to the first gate line and the data line, and a shielding electrode overlapping the data line;
forming a second passivation layer on the first electrode and the shielding electrode; and
forming a second electrode, which is electrically connected to the second gate line and the shielding electrode, on the second passivation layer;
providing a second display panel, comprising:
forming a third electrode on a second substrate;
assembling the first display panel and the second display panel to face each other;
forming a liquid crystal layer comprising an alignment assisting agent, between the first display panel and the second display panel;
applying a voltage to the first electrode, the second electrode and the third electrode of the assembled first and second display panels, and
irradiating light to the liquid crystal layer in a state where the voltage is applied to each of the first electrode, the second electrode and the third electrode,
wherein
the second electrode comprises a branch portion, and
when the voltage is applied to the first electrode, the second electrode, and the third electrode, the same voltage is applied to the second electrode and the third electrode.

18. The method of claim 17, wherein the first electrode and the third electrode have a plate shape.

19. The method of claim 18, wherein the providing the first display panel further comprises forming a storage electrode line, which is spaced apart from the first gate line and the second gate line, on the first substrate, before the forming the data line.

20. The method of claim 19, wherein
the first electrode comprises a first sub electrode and a second sub electrode which are separated from each other,
the second electrode comprises a third sub electrode overlapping the first sub electrode, and a fourth sub electrode overlapping the second sub electrode, and
each of the third sub electrode and the fourth sub electrode comprises the branch portion.

* * * * *